United States Patent [19]
Dahl

[11] 3,799,579
[45] Mar. 26, 1974

[54] REAR SHIELD FOR ROTARY LAWNMOWER

[75] Inventor: Einar S. Dahl, Galesburg, Ill.

[73] Assignee: Outboard Marine Corporation, Waukegan, Ill.

[22] Filed: Nov. 6, 1972

[21] Appl. No.: 304,067

[52] U.S. Cl. .............................. 280/150 R, 56/17.4
[51] Int. Cl. .............................................. B60r 27/00
[58] Field of Search............ 280/150 R, 43; 180/96; 56/17.4

[56] References Cited
UNITED STATES PATENTS

| | | | |
|---|---|---|---|
| 3,524,307 | 8/1970 | Dahl | 56/17.4 |
| 3,432,183 | 3/1969 | Groll | 280/150 R |
| 3,040,503 | 6/1962 | Ogle | 56/17.4 |
| 2,982,079 | 5/1961 | Schesser | 56/17.4 |
| 3,190,061 | 6/1965 | Gilbertson | 180/96 |

*Primary Examiner*—Robert R. Song
*Attorney, Agent, or Firm*—Michael, Best & Friedrich

[57] ABSTRACT

Disclosed herein is a rotary lawnmower including a blade housing having a downwardly depending rear wall which extends transversely of the direction of intended mower travel and one or more rear ground engaging wheels which are rotatably supported on the blade housing by a cutting height adjustment means. The cutting height adjustment means can be selectively adjusted to vary the vertical relationship between the wheel axis and the blade housing so as to vary the height of cut. A protective shield extending substantially across the entire width of the blade housing rear wall is supported for pivotal movement about a transversely extending axis by a link which carries the shield rearwardly of the rear wall with the bottom edge of the shield spaced a small distance above the ground. The link is connected to the cutting height adjustment means so that, when adjustments are made in the cutting height, the shield pivot axis is moved a corresponding amount and a predetermined vertical distance between the shield pivot axis and the ground is maintained constant at all cutting heights. The shield, which is preferably a one-piece, box-like construction, effectively acts as a trap for objects which may be hurled from beneath the rear wall of the blade housing.

10 Claims, 6 Drawing Figures

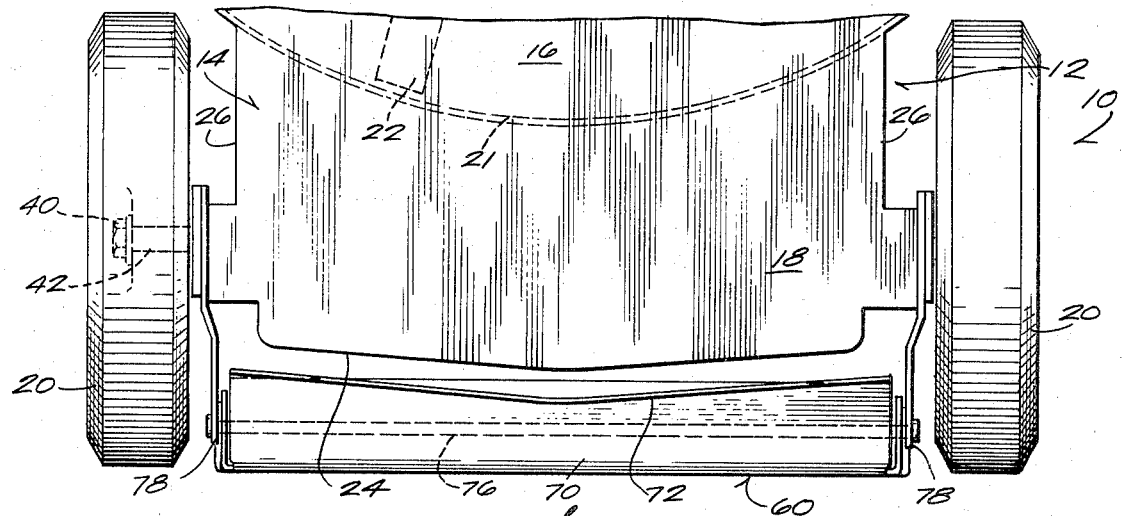
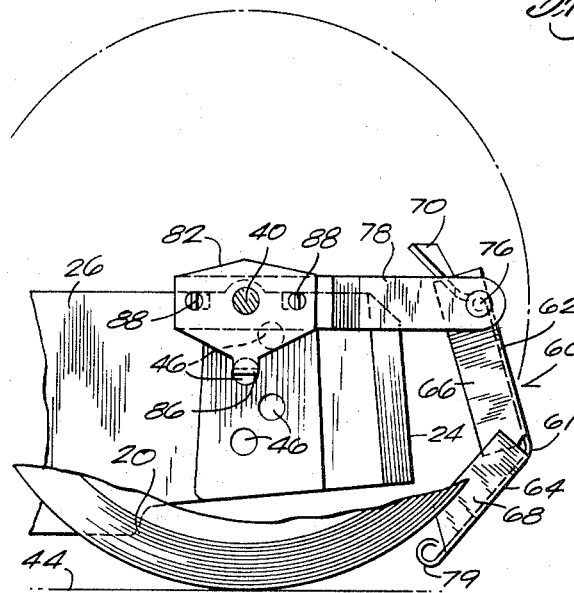
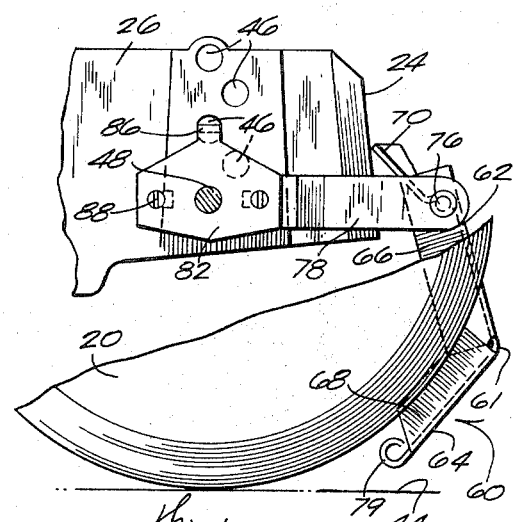
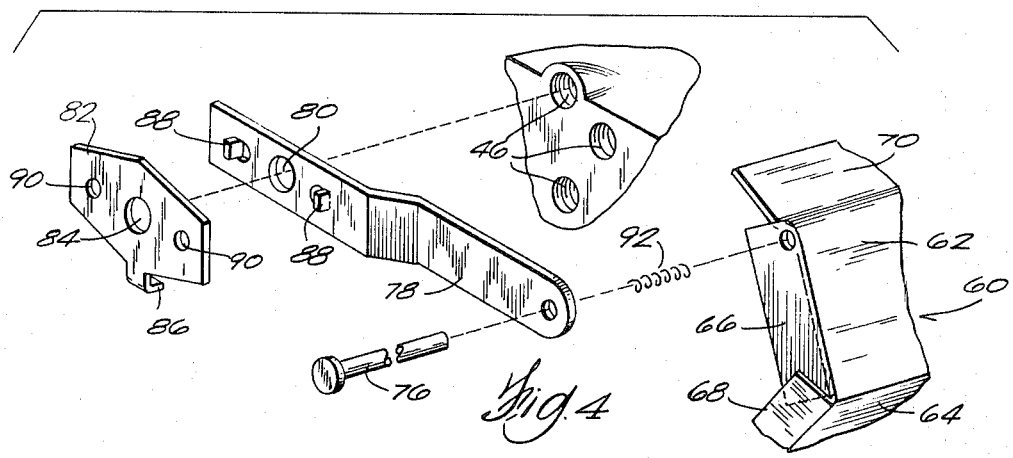

REAR SHIELD FOR ROTARY LAWNMOWER

BACKGROUND OF THE INVENTION

This invention relates to rotary lawnmowers and, more particularly, to rotary lawnmowers having a protective shield to prevent objects from being discharged at a high velocity rearwardly from the mower.

During the operation of a conventional rotary lawnmower, the rapidly rotating cutting blade can contact objects, such as small stones, twigs, small pieces of wire or glass, and the like, and propel them at high velocity from underneath the blade housing, thereby endangering the operator and bystanders. The plane of the rotary cutting blade is typically located near the lower edge of the blade housing. When the mower is adjusted to make short cuts, the clearance between the blade housing and ground is usually small enough to prevent the impacted objects from escaping from the housing. However, when the blade housing is raised to make longer cuts, this clearance increases and the possibility of objects being propelled rearwardly from beneath the housing towards the operator and bystanders increases.

Various types of rear safety guards have been proposed by the prior art. For example, U.S. patents, (Groll) U.S. Pat. No. 3,432,183 issued Mar. 11, 1969, (Welsh) U.S. Pat. No. 3,378,995 issued Apr. 23, 1968, and (Gilbertson) U.S. Pat. No. 3,226,920 issued Jan. 4, 1966, describe rear guard devices which are pivotally attached to the blade housing and are arranged so that a lower edge rides in contact with the ground. Devices of this type produce substantial drag and are subject to becoming hung up on obstructions such as tree roots, particularly when backing the mower. Other devices, such as those disclosed in U.S. patents (Nelson), U.S. Pat. No. 3,402,535 issued Sept. 24, 1968, (Gilbertson) U.S. Pat. No. 3,190,061 issued June 22, 1965, and (McDonagh) U.S. Pat. No. 3,106,812 issued Oct. 15, 1963, utilize a roller which rides over the ground. Although the drag is reduced somewhat with these devices, they also are subject to becoming hung up on large obstructions during backing of the mower. Other prior art constructions are described in U.S. patents, (Miskiewicz) U.S. Pat. No. 3,570,225 issued Mar. 16, 1971 and (Miskiewicz) U.S. Pat. No. 3,212,245 issued Oct. 19, 1965.

SUMMARY OF THE INVENTION

This invention provides a protective shield supported for pivotal movement about a transversely extending axis supported rearwardly of a transversely extending rear blade housing wall with the protective shield pivot axis vertically spaced a predetermined distance above the ground. Means are provided for connecting one or more rear ground engaging wheels to the blade housing for rotation about an axis of rotation and for selectively moving the wheel vertically with respect to the blade housing to adjust the height of cut. Support means carrying the protective shield pivot axis is operatively connected to the wheel connecting means so that, when vertical adjustments are made in the cutting heights, the shield is moved vertically a corresponding amount to thereby maintain constant the predetermined distance between the shield pivot axis and the ground at all cutting height settings. With this arrangement, the shield can swing rearwardly or forwardly with respect to the blade housing and thereby ride over and clear obstructions during forward or backward movement of the mower. Preferably, the shield is in the form of a box-like construction and extends transversely across the entire width of the blade housing rear wall so it can effectively trap objects which might be hurled from beneath the rear of the blade housing.

One of the objects of this invention is to provide a rear protection guard for a rotary lawnmower which is capable of readily clearing obstructions during forward and backward movement of the mower.

Another object of this invention is to provide, in a rotary lawnmower, a rear protective guard which is pivotally supported on a cutting height adjustment means so that a predetermined vertical distance is constantly maintained between the shield pivot axis and the ground, without special adjustments, at all cutting height settings.

A further object of this invention is to provide such a shield which is arranged so that any tendency of the grass stubble to raise the shield is minimized.

Other objects and advantages of this invention will become apparent from the following description and accompanying drawing.

BRIEF DESCRIPTION OF THE DRAWINGS

FIG. 1 is a partial bottom view of a lawnmower embodying various of the features of this invention.

FIGS. 2 and 3 are enlarged, fragmentary side views of the lawnmower shown in FIG. 1 respectively showing a support means arranged in accordance with the invention at positions corresponding to the minimum and maximum heights of cut.

FIG. 4 is an enlarged, exploded view of some of the components of the lawnmower shown in FIGS. 2 and 3.

DESCRIPTION OF THE PREFERRED EMBODIMENTS

Figure 5:
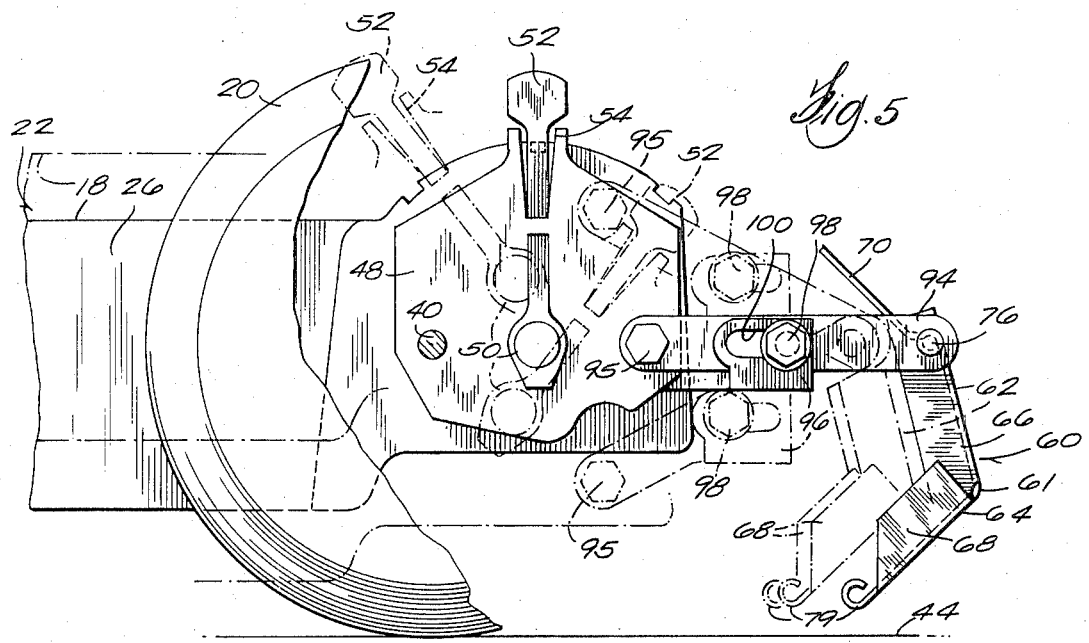
FIG. 5 is an enlarged, fragmentary side view showing an alternate construction of the cutting height adjustment means and also showing, in dotted outline, the location of various components when the blade housing is raised and lowered with respect to the ground.

Before explaining the invention in detail, it is to be understood that the invention is not limited in its application to the details of the construction and arrangement of the components set forth in the following description or illustrated in the drawings. The invention is capable of other embodiments and of being practiced or carried out in various ways. Also, it is to be understood that phraseology or terminology employed herein is for the purpose of description and should not be regarded as limiting.

The drawings illustrate a rotary lawnmower 10 including a blade housing 12 having a horizontally extending top deck 14 with a central portion 16 and an extension or rear portion 18 extending rearwardly from the central portion 16. Depending from the top deck 18 is a generally annular, vertically extending, substantially continuous wall 21 which generally surrounds the peripheral path of the rotary cutter blade 22. The annular wall 21 can include one or more discharge openings (not shown) and has a lower edge adjacent to or slightly below the horizontal plane of the cutter blade 22.

A vertically extending rear wall 24 depends from the rear margin of the rear portion 18 of the top deck 14. Vertically extending side wall segments 26 depend from the sides of the rear portion 18 of the top deck 14 and connect the outer lateral portions of the rear wall 24 to the annular wall 21.

The blade housing 12 is suitably supported by three or more ground engaging wheels including a pair of transversely spaced rear wheels 20 mounted for rotation adjacent the side wall segments 26 and about an axis located forward of the rear wall 24, such as by a stud 40 extending through a hub 42 provided in the wheel 20 and threaded into the side wall segment 26.

Means are provided for selectively adjusting the vertical relationship of the wheel axis with respect to the blade housing 12 to vary the vertical relationship between the blade housing 12 and the ground 44 and thus vary the cutting height of the cutter blade 22. Various suitable means capable of making this adjustment can be used.

In the construction shown in FIGS. 1–4, the cutting height adjustment means includes a plurality of vertically spaced, staggered, threaded holes 46 in the side walls segments 26 for receiving the wheel studs 40 with the corresponding holes 46 on the opposite side walls segment 26 being axially aligned. To make an adjustment in the height of cut, the studs 40 for both the wheels 20 are unthreaded from the side wall segments 26 and threaded into another of the holes 46 corresponding to the desired cutting height.

In the construction illustrated in FIG. 5, the cutting height adjustment means includes a vertical plate 48 pivotally mounted on the side wall segment 26 at 50 and the wheel 20 is rotatably mounted on the wheel stud 40 which in turn is mounted on the plate 48. A spring member 52 is mounted on the plate 48, extends through a slot 54 provided in the plate 48, and includes an inwardly offset portion (not shown) which is releasably urged into one of a plurality of index notches (not shown) provided in the side wall segments 26 and corresponding to different cutting height settings. To make an adjustment in the height of cut, the spring member 52 is moved outwardly with respect to the side wall segment 26 (i.e., moved outwardly from the surface of the paper as viewed in FIG. 5) to release the offset portion from the index notch and the plate 48 is rotated either clockwise or counterclockwise to raise or lower the wheel 20 relative to the blade housing 12 and thereby respectively lower and raise the blade housing 12 with respect to the ground 44, as shown by the dashed outlines in FIG. 5.

Figure 6:
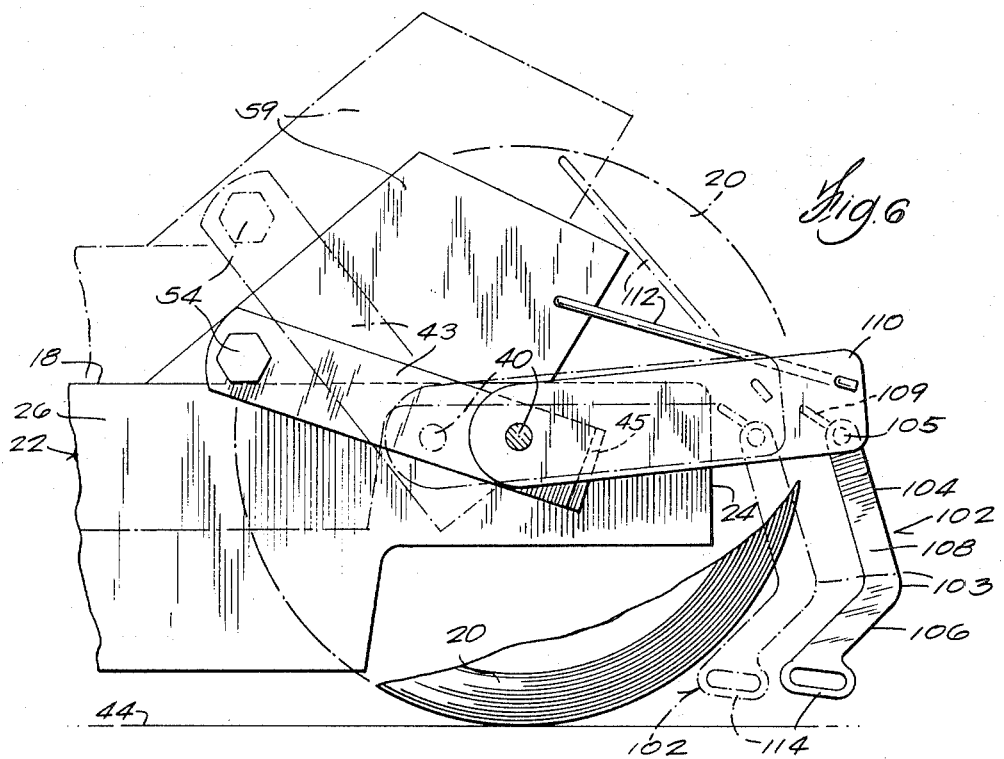
FIG. 6 is an enlarged, fragmentary side view showing a further alternate construction of the cutting height adjustment means and the shield and also showing, in dotted outline, the location of various components when the blade housing is raised with respect to the ground.

In the construction illustrated in FIG. 6, the cutting height adjustment means is generally arranged in a manner described in U.S. patent (Shaw) U.S. Pat. No 2,947,132 issued Aug. 2, 1960, which patent is incorporated herein by reference. The wheels 20 are rotatable with respect to the wheel studs 40 (corresponding to the support axle 40 in FIG. 2 of U.S. Pat. No. 2,947,132) and each of the wheel studs 40 is carried on an arm 43 of a yoke 45. The arm 43 is pivotally attached at 54 (corresponding to the drive shaft 35 in FIG. 2 of U.S. Pat. No. 2,947,132) to a fixed support 59 mounted on the rear portion 18 of the blade housing 12 (corresponding to the mower handle support bracket 59 shown in FIG. 1 of U.S. Pat. No. 2,947,132). To make an adjustment in the height of cut, the yoke 45 is raised or lowered (such as by raising or lowering the detent lever 47 of U.S. Pat. No. 2,947,132) and the arm 43 pivots about the pivot axis provided by the wheel stud 40 to lower or raise the blade housing 12 with respect to the ground 44. The solid lines illustrate the position of the rear portion 18 of the blade housing 12, the support 59, the arm 43, and the yoke 45 at one cutting height setting. The dashed outline illustrates the position of these components when the detent level 47 of U.S. Pat. No. 2,947,132 has been lowered to obtain a higher cutting setting.

In accordance with the invention, a protective shield 60 is pivotally carried by a support means for swingable movement about an axis extending transversely of the direction of mower travel and positioned rearwardly of the rear wall 24. The support means carries the shield 60 at a predetermined vertical distance between the shield pivot axis and the ground and is operatively connected to the cutting height adjustment means so that this predetermined distance is maintained constant at all cutting height settings without any special adjustment. This constant distance results in minimum contact resistance between the bottom edge of the shield and the grass stubble and permits the shield to swing rearwardly or forwardly on its pivot axis with respect to the rear wall, thereby permitting the shield to ride over obstructions during either forward or backward movement of the mower.

While other specific constructions can be used, in the construction illustrated in FIGS. 1–4, the protective shield 60 includes an elongated transverse member 61 having side portions 62, 64 connected together along one edge at an obtuse angle (e.g., 120°), end portions 66, 68 extending from the opposite outer lateral margins of the side portions 62, 64 toward the blade housing rear wall 24, and a top portion 70 extending at an obtuse angle upwaredly and inwardly from the top margin of the side portion 62 toward the blade housing rear wall 24. The shield 60 can be constructed from any suitable, relatively sturdy, light weight material (including flexible materials), such as thin sheet metals, plastics, and the like, and is preferably a one-piece construction.

The shield 60 is swingably supported on a transverse rod 76 extending between a pair of support links 78 which are supported from the opposite side wall segments 26 of the blade housing 12 and extend rearwardly of the blade housing rear wall 24. The shield 60 includes a bottom edge 79 which is preferably rounded and is dimensioned so there is a small clearance between the bottom edge 79 and the ground 44 when supported on the blade housing 12. Thus, the shield 60 is free to swing forwardly and rearwardly relative to the blade housing rear wall 24 and thereby can ride over and clear obstructions during forward or backward movement of the mower. Also, this swinging movement results in minimum contact between the shield 60 and the grass stubble.

The shield 60 is dimensioned so the end portions 66, 68 extend laterally beyond the side wall segments 26 and the box-like construction provided by the side, end and top portions effectively acts as a trap for any object which may be hurled from beneath the rear wall 24. In order to maximize the trapping effect provided by the shield 60, the inner edge 72 of the top portion 70 is preferably arranged to conform to the contour of the rear wall 24 of the blade housing 12 so there is a minimum opening between the shield and the blade housing through which objects can escape.

In order to maintain the above-mentioned constant vertical distance between the shield pivot axis provided by the rod 76 and the ground 44 at all cutting heights, each link 78 is supported from the respective side wall segment 26 by the wheel stud 40 which extends through an aperture 80 provided in the link 78, thereby vertically positioning the links 78 in a fixed relationship with the wheel axis. Each of the links 78 is held in a horizontal position by a retainer 82 having an aperture 84 through which the wheel stud 40 extends and an integral tab 86 which fits into an unused wheel stud hole 46. The link 78 is positively located horizontally with respect to the retainer 82 by a pair of horizontally spaced integral tabs 88 which fit in corresponding apertures 90 provided in the retainer 82.

The retainer 82 is symmetrically arranged so it can be positioned with the tab 86 fitted into an unused stud hole 46 regardless of which of the holes is being used to attach the wheel 20 to the side wall segment 26. For example, FIG. 2 shows that the positions of the retainer 82, the link 78, and the wheel 20 for the lowest cutting setting and FIG. 3 shows the position of these components for the highest cutting setting.

From the above description, it can be seen that, as the vertical position of the wheel 20 is adjusted with respect to the blade housing 12, the vertical position of the rod 76 is adjusted correspondingly thereby maintaining a constant vertical distance between the shield pivot axis provided by the rod 76 and the ground 44 at all cutting heights settings. Since the side portions 62 and 64 are arranged at an angle and the shield 60 can swing rearwardly about the rod 76, the side portion 64 normally assumes a substantially vertical position as the shield 60 is pulled over the grass stubble during mowing to thereby further minimize resistance. This minimal resistance prevents the bottom edge 79 of the shield 60 from being held unduly high off the ground 44, thereby providing maximum protection against objects being hurled rearwardly from beneath the shield.

In order to further prevent the shield 60 from being urged upwardly from its normal position by the force of the grass stubble, a spiral spring 92 can be connected between the link 78 and the shield 60.

In the alternate construction for the shield support means illustrated in FIG. 5, the protective shield 60 is arranged in the same manner as shown in FIGS. 1–4 and common reference numerals are used for common components.

The shield 60 is swingably supported on the rod 76 extending between a pair of support links 94 which are pivotally mounted at 95 on the opposite cutting heights adjustment plates 48 and extend rearwardly of the blade housing rear wall 24. A support bracket 96 is interposed between each of the plates 48 and the respective blade housing side wall segments 26 and is affixed to the side wall segment. The middle portion of the link 94 is pivotally mounted to the support bracket 96 by a bolt 98 extending through an elongated horizontal slot 100 provided in the support bracket 96. The support brackets 96 are vertically positioned on the side wall segments 26 so that a small clearance exists between the bottom edge 79 of the shield 60 and the ground 44 as described above.

When the spring member 52 is disengaged from an index notch on the side wall segment 26 and the plate 48 is rotated either clockwise or counterclockwise to move the blade housing 12 vertically relative to the wheel axis (i.e., wheel stud 40) and thereby change the cutting height, the inner end of the support arm 94 (pivotally attached to the plate 48 at 95) is rotated a corresponding amount. At the same time, the link 94 pivots about the bolt 98 and the outer end of the link 94 (carrying the rod 76) is moved in an opposite direction through an equal arc, thereby maintaining a constant vertical distance between the shield pivot axis and the ground 44 as illustrated by the dashed outline.

In FIG. 6 an alternate construction for the shield and the shield means is shown. The protective shield 102 is arranged in a box-like construction similar to that shown in FIGS. 1–5 and includes an elongated transverse member 103 having angularly related side portions 104, 106, an end portion 108 extending inwardly from the outer lateral margins of the side portions 104, 106 toward the blade housing rear wall 24, and a top portion 109 extending at an obtuse angle upwardly and inwardly from the top margin of the side portion 104 toward the blade housing rear wall 24. The shield 102 is preferably an integral plastic unit formed by conventional plastic molding techniques such as by extruding. It should be understood that the protective shield 102 shown in FIG. 6 can be used with the support means constructions of FIGS. 1–5 and the protective shield shown in FIGS. 1–5 can be used with the support means construction of FIG. 6.

The shield 102 is swingably supported on a transverse rod 105 extending between a pair of support links 110 which are pivotally supported on the wheel studs 40 and extend rearwardly of the blade housing rear wall 24. A lever 112 positioned parallel to the longitudinal axis of the yoke arm 43 is pivotally mounted at its opposite ends on the support bracket 59 and the outer end of the support link 110 and cooperates with the link 110, the yoke arm 43, and the support bracket 59 to form a parallelogram or parallel-crank-four bar linkage arrangement. The links 110 are vertically positioned with respect to the blade housing 12 to provide the small clearance between the bottom edge 114 of the shield 104 and the ground 44 as described above. Any time the yoke 45 is moved to pivot the arm 43 about the pivot axis provided by the wheel stud 40 and thereby raise or lower the blade housing 12 with respect to the ground 44, the outer end of the link 110 carrying the rod 105 is pivoted a corresponding distance about the same axis by the lever 112 to maintain a constant vertical distance between the shield pivot axis provided by the rod 105 and the ground 44, as illustrated by the dashed outline.

Various features of the invention are set forth in the following claims:

What is claimed is:

1. A lawnmower comprising a blade housing having a downwardly depending rear wall extending generally transversely of the direction of the intended mower travel, a ground engaging rear wheel, means for connecting said wheel to said blade housing for rotation about an axis of rotation and for selectively moving said wheel axis vertically with respect to said blade housing to adjust the height of cut, a protective shield having a bottom edge, and support means including a link having a first end portion pivotally connected to said shield for carrying said shield rearwardly of said rear wall with said bottom edge spaced above the ground and for pivotal movement of said shield about a transversely extending axis with said shield pivot axis vertically spaced a predetermined distance above the ground including means cooperating with said link and said wheel connecting means to maintain said shield pivot axis at said predetermined distance notwithstanding variations in the height of cut.

2. A lawnmower according to claim 1 wherein said shield includes an elongated transverse member extending substantially along the entire width of said blade housing rear wall, having upper and lower side portions connected together at an obtuse angle and extending toward said blade housing rear wall, having outer lateral ends, having end portions extending from said outer lateral ends inwardly toward, but horizontally spaced from, said blade housing rear wall, and having a top portion extending at an obtuse angle from said upper side portion and inwardly toward, but horizontally spaced from, said blade housing rear wall.

3. A lawnmower according to claim 2 wherein said bottom edge is rounded.

4. A lawnmower according to claim 3 wherein the edge of said top portion adjacent to said blade housing rear wall is configured to conform to the contour of said rear wall.

5. A lawnmower according to claim 1 including a plurality of vertically spaced holes in said blade housing corresponding to different heights of cut, a hub in said wheel, a stud extending through said hub to define said wheel axis and mounted in one of said holes, an aperture in said link through which said stud extends, and means for retaining said link in a substantially horizontal position.

6. A lawnmower according to claim 5 wherein said retainer means comprises a retainer plate connected to said link and including an integral tab fitting into another one of said stud holes to stabilize the horizontal position of said retainer plate.

7. A lawnmower according to claim 1 including a generally vertical plate carrying said rear wheel axis means and pivotally mounted on said blade housing at a point spaced from said wheel axis, means for selectively pivoting said vertical plate with respect to said blade housing to vary the vertical position of said wheel axis with respect to said blade housing and thereby vary the height of cut, said link having a second end portion and a central portion between said end portions, means for pivotally connecting said link second end portion to said vertical plate, a support bracket affixed to said blade housing, and means for pivotally connecting said link central portion to said bracket so that, when said vertical plate is pivoted relative to said blade housing, said wheel axis is vertically displaced relative to said blade housing to vary the height of cut and said first end portion of said link is moved to thereby maintain said predetermined distance between said shield pivot axis and the ground.

8. A lawnmower according to claim 1 wherein said wheel connecting means includes a yoke having an arm which is pivotally connected at one end of said blade housing and is pivotally connected at the other end to said wheel axis means, means adjustably connecting said yoke with said blade housing for adjusting the vertical position of said wheel axis with respect to said blade housing, and wherein said support means includes a lever pivotally connected at its opposite ends to said blade housing and said first end portion of said link and cooperating with said arm, said link, and said blade housing to define a parallelogram linkage arrangement, whereby movement of said yoke to vary the vertical position of said wheel axis with respect to said blade housing causes movement of said link to thereby maintain said predetermined distance between said shield pivot axis and the ground.

9. A lawnmower according to claim 7 wherein said shield includes an elongated transverse member extending substantially along the entire width of said rear wall, having upper and lower side portions connected together at an obtuse angle and extending toward said blade housing rear wall, having outer lateral ends, having end portions extending from said outer lateral ends inwardly toward, but horizontally spaced from, said blade housing rear wall, and having a top portion extending at an obtuse angle from said upper side portion and inwardly toward, but horizontally spaced, from said blade housing rear wall.

10. A lawnmower according to claim 8 wherein said shield includes an elongated transverse member extending substantially along the entire width of said blade housing rear wall, having upper and lower side portions connected together at an obtuse angle and extending toward said blade housing rear wall, having outer lateral ends, having end portions extending from said outer lateral ends inwardly toward, but horizontally spaced, from said blade housing rear wall, and having a top portion extending at an obtuse angle from said upper side portion and inwardly toward, but horizontally spaced, from said blade housing rear wall.

* * * * *